United States Patent [19]

McKenzie

[11] Patent Number: 4,841,668
[45] Date of Patent: Jun. 27, 1989

[54] GOPHER KILLER

[76] Inventor: Carl O. McKenzie, 17300 E. 121st, Broken Arrow, Okla. 74011

[21] Appl. No.: 175,141

[22] Filed: Mar. 30, 1988

[51] Int. Cl.$^4$ .............................................. A01M 1/20
[52] U.S. Cl. ........................................................ 43/124
[58] Field of Search ....................... 43/124, 131, 132.1

[56] References Cited

U.S. PATENT DOCUMENTS

| | | | |
|---|---|---|---|
| 1,990,262 | 2/1935 | Bailey | 43/124 |
| 2,390,686 | 12/1945 | Bishop | 43/124 |
| 2,539,271 | 1/1951 | Rianda | 43/124 |
| 2,783,581 | 3/1957 | Lee | 43/124 |
| 3,550,542 | 12/1970 | Hollis | 43/124 |
| 3,816,610 | 6/1974 | Lusby | 43/124 |
| 4,035,482 | 7/1977 | Royster | 43/124 |
| 4,132,026 | 1/1979 | Dodds | 43/131 |
| 4,413,440 | 11/1983 | Schultz | 43/124 |

Primary Examiner—Gene P. Crosby
Attorney, Agent, or Firm—Head & Johnson

[57] ABSTRACT

A system of killing underground burrowing varmints such as gophers. The runs or underground tunnels of the varmints is detected. A "sticky" substance such as molasses impregnated with a poison is injected into the run thus detected. When the gophers pass through this part of the run their feet get the sticky substance on them. The rodents or varmints will then to lick the sticky substance off and thus ingest the poison and be killed.

3 Claims, 1 Drawing Sheet

GOPHER KILLER

BACKGROUND OF THE INVENTION

This invention relates to a system of destroying undesirable underground burrowing varmints and especially gophers. There are many burrowing rodents inhabiting the United States. Pocket gopher (Geomyidae) are burrowing rodents with large front claws, furlined cheek pouches, small ears and small eyes. They occur chiefly in the west and in the south. Ground squirrels (Citellus) are often called gophers and so is the gopher Tortoise (Gopherus) which are native to the southern states. The term "gopher" is from an old French word, meaning to tunnel. Although one seldom sees a gopher in its natural habitat, visual evidence of them are quite common in the form of little piles or mounds of dirt which the gopher has dug out of its tunnel. These tunnels run more or less horizontally and permit the gophers to find roots to eat and other nourishments. The entry hole to these runs that are evidenced by the mounds of dirt are very unsightly on a lawn. Further, these holes can be quite dangerous if they are in an area where animals such as dogs, or horses or cattle may run. If one of these should step in a gopher hole then it could break a leg or seriously hurt itself. Thus, it is quite imperative that the population of these gophers be controlled or eliminated in lawns and pasture areas.

In the past many attempts have been made to eliminate gophers. Some people have tried to set traps to catch the gophers. However, the gopher does not usually go where the trap is set. It has also been known to poison grain and place the grain in the hole or adjacent the holes for the gopher. However, the gopher largely ignores the poison grain. This is evidenced by the grain sprouting and coming up and the gophers remaining in the area treated. Further, if the poison grain is put on the ground it might be eaten by other animals that it is desired to protect. Some have tried smoke bombs or connected an automatic exhaust to the hole at the surface. None of these methods are very suitable.

Thus, it is seen that the control of the burrowing animals is a major problem.

It is therefore an object of this invention to provide a new system for protecting lawns and pastures from these burrowing animals such as gophers.

It is yet another object of this invention to provide a system which will rid the area of gophers but offer essentially no risk to the domestic animals.

SUMMARY OF THE INVENTION

This is a method of poisoning burrowing varmints such as gophers and prairie dogs that have underground runs or tunnels. The tunnel is first located. This can be done by probing around a mound of dirt signifying that there is a gopher in the area. Once the tunnel is found a sticky substance such as molasses which has been treated with a poison such a Strychnine is injected into the tunnel.

The gopher when passing through the tunnel will get the sticky molasses on its feet. The gopher then attempts to clean its feet by licking them with its tongue. The poison then enters into the rodents system where the poison takes effect.

DETAILED DESCRIPTION OF THE INVENTION

Figure 1:
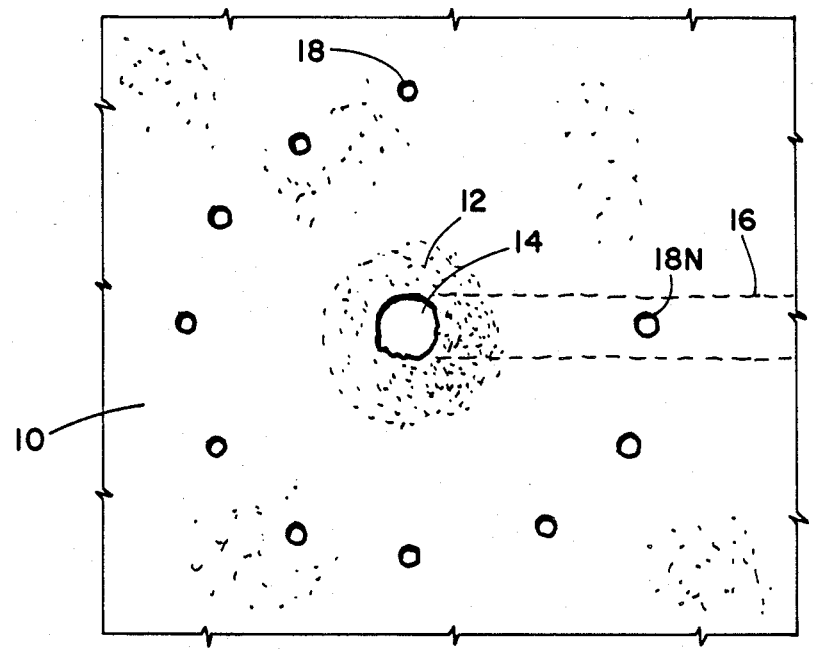
FIG. 1 illustrates a surface or top view illustrating a gopher hole and its run or tunnel.

Attention is now directed to FIG. 1. Shown thereon is a portion of earth 10 which may be a lawn or a pasture or even farmland. A gopher mound 12 is shown in the approximate center of FIG. 1. This is a mound of loose dirt which the gophers or other varmints have burrowed up hole 14. This soil 12 has been dug from an underground run 16 which is really an underground tunnel through which the gopher will move while they are seeking various roots or insects to eat. These runs are beneath the surface of the earth and may be normally from about six inches to about twelve inches in depth. The tunnels 16 are such that the gopher may pass through it easily.

In accordance with my invention a molasses treated with poison is deposited into the run 16. In order to do this I must first locate the position of the run 16. I take a sharp probe and punch holes 18 into the ground in preferably a circular pattern about the mole hill 12. These holes 18 are a short distance from the hole 14 and for example may be about a foot therefrom. I keep punching holes 18 until I punch hole 18N which is at run 16. It is easy to determine when I have encountered the run 16. On all of the other holes 18 that I punch with the probe I can push the probe down for about a foot by applying continuous pressure against a substantially continuous resistance. When I encounter the run I will be pushing down on the probe where the probe encounters essentially no resistance to its downard movement indicating that the probe is passing through the run 16. I then know the location of the run. The probe which I use can be a small diameter piece of metal such as steel with a handle on top. The probe may be various sizes but I have found that about one quarter of an inch is quite adequate.

Figure 2:
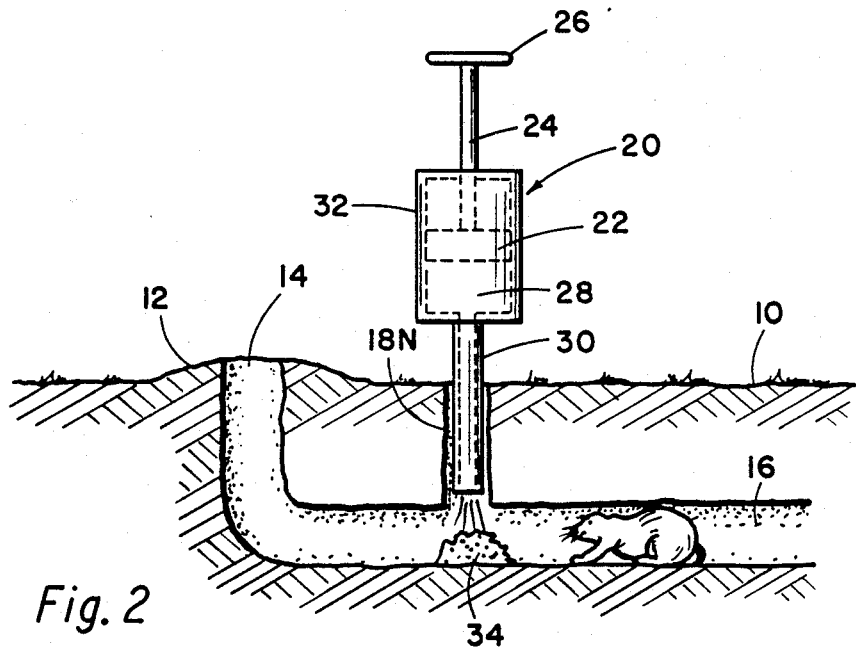
FIG. 2 illustrates a system for injecting poisoned molasses into the run.

Attention is now directed to FIG. 2 which shows one system for getting the poisoned molasses into the run. I first prepare the molasses. I can take any commercially available molasses such as that served in southern restaurants and mix a poison into the molasses. There are many poison-like materials approved by the EPA which will kill varmints. I have found that a particularly effective poison to use with molasses is Strychnine. I place the poisoned molasses into a pump 20 which typically may be a cylindrical container having a housing 32 and a piston 22 connected by plunger rod 24 to handle 26. The plunger rod 24 extends through the top which may be threadedly attached to the upper end of the cylindrical container. The poisoned molasses is placed into the space 28 below piston 22. The pump 20 has an outlet stub 30. The molasses may be put into the space 28 in any well known manner such as by removing the top and piston 22 and pouring it into the cylindrical container and then replacing the plunger and the top. The stub 30 is placed into hole 18N and is pushed inwardly toward the run 16. I then push down on handles 26 which moves piston 22 downwardly and holding up on the housing 32 of the pump the poisoned molasses is forced down through extension 30 into the run 16 where it is deposited in a sticky pile or puddle 34. After the pile of molasses has been deposited in the run, the stub 30 and the pump 20 are removed. Although the probe hole 18N is rather small, e.g., one quarter of an inch or so, there will be a little light possibly coming through it. It is believed that this light may attract the gopher and as the gopher comes to investigate the light it will get the sticky molasses with the poison on its feet. The gopher despises having anything sticking to its feet. Its method of cleaning its feet is to lick. When licking the molasses off of its feet the gopher wil swallow the poison with the molasses which promptly kills that gopher.

I have used the method described herein successfully to rid my lawn of all gophers. I detected the run around each mound of dirt 12 in the manner described above. I then used an oil can, the kind that has a screw-off top and stem that is activated by pushing on the bottom with your thumb. I cut the stem off to be about six or eight inches long. I took the top off and put molasses and Strychnine mixed together into the inside of the oil can. I then put the top back on. The next thing to do was to poke the hollow stem through the hole 18N and deposit the sticky poisoned molasses into the run. I did this for each gopher hole that I detected. The gophers in my lawn were quickly and quietly destroyed. This clearly shows that my method using molasses and Strychnine works exceptionally well. It is to be noted that in my method the poison is all deposited in underground runs or tunnels. Thus, there is essentially no danger to domestic animals or pets.

I have used the term gopher as the underground varmint which I have been exterminating. This system will apply to any underground varmint which burrow tunnels through the earth.

While the invention has been described with a certain degree of particularity, it is manifest that many changes may be made in the details of construction and the arrangement of components without departing from the spirit and scope of this disclosure. It is understood that the invention is not limited to the embodiments of set forth therein for purposes of exemplification, but is to be limited only by the scope of the attached claim or claims, including the full range of equivalency to which each element thereof is entitled.

What is claimed is:

1. A method of destroying underground gophers which burrow tunnels beneath the surface of the earth and deposits mounds of dirt on the earth's surface at an end of the tunnel which comprises:
    punching holes in the earth in a path around said mound until a hole encounters the tunnel;
    obtaining a mixture consisting only of molasses and a poison;
    pumping only said mixture down a hole encountering said tunnel;
    leaving said mixture down said hole until a gopher steps in it with its feet and licks the poisoned molasses off its feet with the gopher promptly being killed.

2. A method as defined in claim 1 including: leaving the probe hole open so that a small amount of light may enter the tunnel.

3. A method as defined in claim 1 in which said poison is Strychnine.

* * * * *